United States Patent
Chen et al.

(10) Patent No.: US 10,850,242 B2
(45) Date of Patent: Dec. 1, 2020

(54) TWO STAGE GAS-GAS MIXER

(71) Applicant: SABIC Global Technologies, B.V., Bergen op Zoom (NL)

(72) Inventors: Lei Chen, Sugar Land, TX (US); Sreekanth Pannala, Sugar Land, TX (US); Robert Broekhuis, Sugar Land, TX (US); Hua Bai, Sugar Land, TX (US); Pankaj Gautam, Sugar Land, TX (US); David West, Sugar Land, TX (US)

(*) Notice: Subject to any disclaimer, the term of this patent is extended or adjusted under 35 U.S.C. 154(b) by 0 days.

(21) Appl. No.: 16/582,129

(22) Filed: Sep. 25, 2019

(65) Prior Publication Data

US 2020/0156025 A1     May 21, 2020

Related U.S. Application Data

(60) Provisional application No. 62/737,450, filed on Sep. 27, 2018.

(51) Int. Cl.
| | |
|---|---|
| *B01F 5/04* | (2006.01) |
| *B01J 4/00* | (2006.01) |
| *B01F 3/02* | (2006.01) |
| *B01F 5/00* | (2006.01) |

(52) U.S. Cl.
CPC ............. *B01F 5/0463* (2013.01); *B01F 3/02* (2013.01); *B01J 4/002* (2013.01); *B01F 2005/0011* (2013.01); *B01F 2005/0042* (2013.01); *B01F 2215/0036* (2013.01)

(58) Field of Classification Search
CPC ...... B01F 5/0463; B01F 5/0456; B01F 5/046; B01F 3/02; B01F 2215/0036; B01J 4/001; B01J 4/002; F23D 14/62; F23D 14/64
See application file for complete search history.

(56) References Cited

U.S. PATENT DOCUMENTS

| | | | |
|---|---|---|---|
| 3,818,938 A | * 6/1974 | Carson | ........ B01F 5/0405 366/167.1 |
| 2015/0152025 A1 | * 6/2015 | Cizeron | ........ C07C 2/78 585/324 |

* cited by examiner

*Primary Examiner* — Lessanework Seifu
(74) *Attorney, Agent, or Firm* — Sheri Higgins; Sheri Higgins Law (57) ABSTRACT

A device for mixing two gas streams, the device includes: an inner pipe, wherein: the inner pipe is arranged substantially concentrically within an outer pipe and forms an annulus between an outer diameter of the inner pipe and an inner diameter of the outside pipe; the inner pipe is closed at a downstream end; and the inner pipe comprises a plurality of perforations; and the outer pipe, wherein: a downstream end of the outer pipe extends into a reactor; the outer pipe is closed at the downstream end; and the downstream end of the outer pipe comprises a plurality of perforations. The mixed gas stream can enter the reactor. The reactor can be an Oxidative Coupling of Methane (OCM) reactor.

20 Claims, 7 Drawing Sheets

TWO STAGE GAS-GAS MIXER

TECHNICAL FIELD

Gas-gas mixers are used in a variety of chemical processes. In the case where two gases are to be mixed, the mixer generally includes two separate inlets for each of the gas streams. One of the gas streams can be an oxygen-containing stream. The mixer can be used to mix the two gas streams together, which can then be fed into a reactor.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Gas-gas mixers are used in a variety of petrochemical processes. The mixer generally includes two separate inlets for each of the gas streams. One of the gas streams can be an oxygen-containing stream. The other gas stream can be a hydrocarbon-containing stream. The mixer can be used to mix the two gas streams together, whereby the mixed stream can then be fed into a reactor. As defined herein, "reactor" means a downstream vessel designed to receive and further process the mixed gas stream, for example by reacting components of the gas stream. Examples of chemical processes in which a mixer can be used include, but are not limited to, oxidative coupling of methane (OCM) and partial oxidation.

An important aspect of the gas-gas mixer design is safe operation. Mixtures of oxidizing agents and fuels, such as mixtures of oxygen and methane, can burn or explode when their composition is within the flammable range. For example, binary methane/oxygen mixtures at ambient pressure and temperature are flammable when their oxygen mole fraction is between 39% to 95%. Mixtures of other compounds and/or at different pressures and temperatures may have broader or narrower flammable ranges. Reactors are commonly designed to process feeds that are not flammable, i.e., the feed to such reactors should be outside of the flammable range: either too fuel-rich or too fuel-lean to sustain combustion. For example, many selective oxidation processes, such as OCM, are designed to operate with non-flammable fuel-rich feeds. However, during the process of mixing the oxidizing gas and the fuel in a mixing device, there will inherently be local regions within the mixing device where flammable conditions exist, such as in the direct vicinity of the point(s) where the two gases are first in fluid communication. An ignition source within such a region may result in an undesired momentary or sustained combustion process.

Ignition sources might be sparks resulting from particles carried by the gas feeds colliding with materials of construction, static electricity discharges, burning combustible particles carried by the oxidizer gas feed, or flashback events from the downstream reactor. In order to minimize the risk of an ignition source occurring within a flammable gas mixture, the volume of flammable gas within the mixture should be minimized. Additional measures can be taken to reduce flammability risks, such as adding a labyrinth structure to foster impact and burnout of particles upstream of the oxygen tube, adding filters upstream of the mixer to remove small particles from the feed streams, reducing the gas velocity near the mixing zone (for example, below 20 m/s), and adding a flame arrestor between the mixer and the reactor.

The flammability risks have been long identified by the industry and therefore, a need exists to reduce or eliminate these risks. It has been discovered that a novel two-stage, gas-gas mixer design ensures good mixing of methane and oxygen containing streams upstream of a reactor by utilizing a two-stage mixing concept and appropriate oxygen and hydrocarbon tube orifices arrangement. The mixer is designed to give rise to a very small flammable volume, thereby minimizing flame/explosion risks. Other advantageous features of the design include that it allows for effective mixing at a wide range of Reynolds numbers as well as a broad range of hydrocarbon to oxidant ratios. Additionally, the design can be easily scaled up for larger reactors by increasing the number of injectors feeding the reactants to the reactor or by geometric scaling of the injector with additional tube orifices. The design is robust and tolerant to manufacturing deviations.

According to certain embodiments, a device for mixing two gas streams, the device comprises: an inner pipe, wherein: the inner pipe is arranged substantially concentrically within an outer pipe and forms an annulus between an outer diameter of the inner pipe and an inner diameter of the outside pipe; the inner pipe is closed at a downstream end; and the inner pipe comprises a plurality of perforations; and the outer pipe, wherein: a downstream end of the outer pipe extends into a reactor; the outer pipe is closed at the downstream end; and the downstream end of the outer pipe comprises a plurality of perforations.

It is to be understood that the discussion regarding the various embodiments is intended to apply to the apparatus, systems, and methods.

Figure 1:
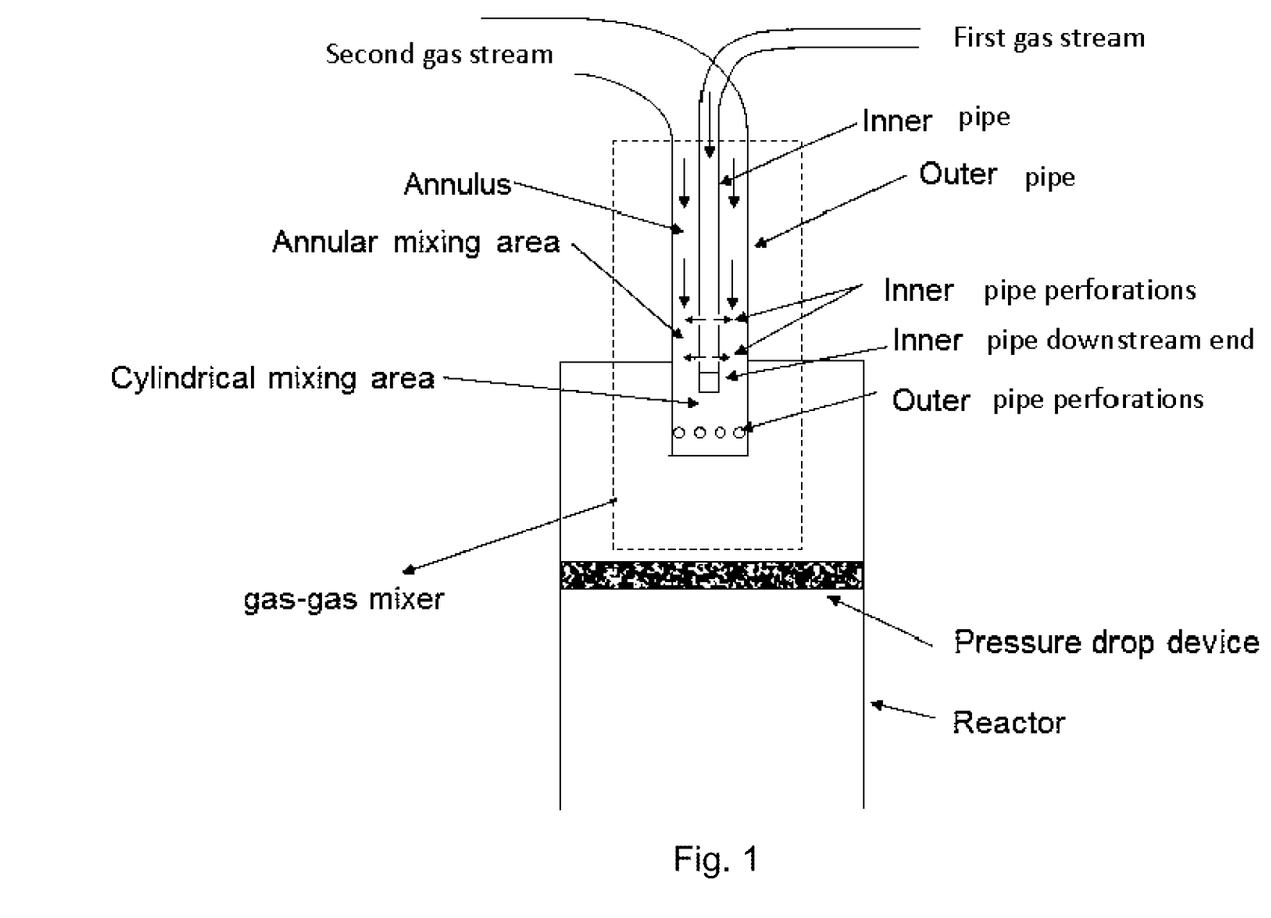
FIG. 1 is a cross-sectional view of a two-stage, gas-gas mixer according to certain embodiments.

Turning to the figures, FIG. 1 is a cross-sectional view of a mixer according to certain embodiments. The mixer includes an inner pipe and an outer pipe. The inner pipe can be configured to be supplied with a first gas stream, flowing from an upstream end towards the downstream end of the inner pipe, and the outer pipe can be configured to be supplied with a second gas stream, flowing from an upstream end towards a downstream end. According to certain embodiments, the first gas stream is an oxygen-containing stream and the second gas stream is a hydrocarbon-containing stream. The oxygen-containing stream can, for example, be air or oxygen gas. The hydrocarbon-containing stream can include methane.

Figure 2:
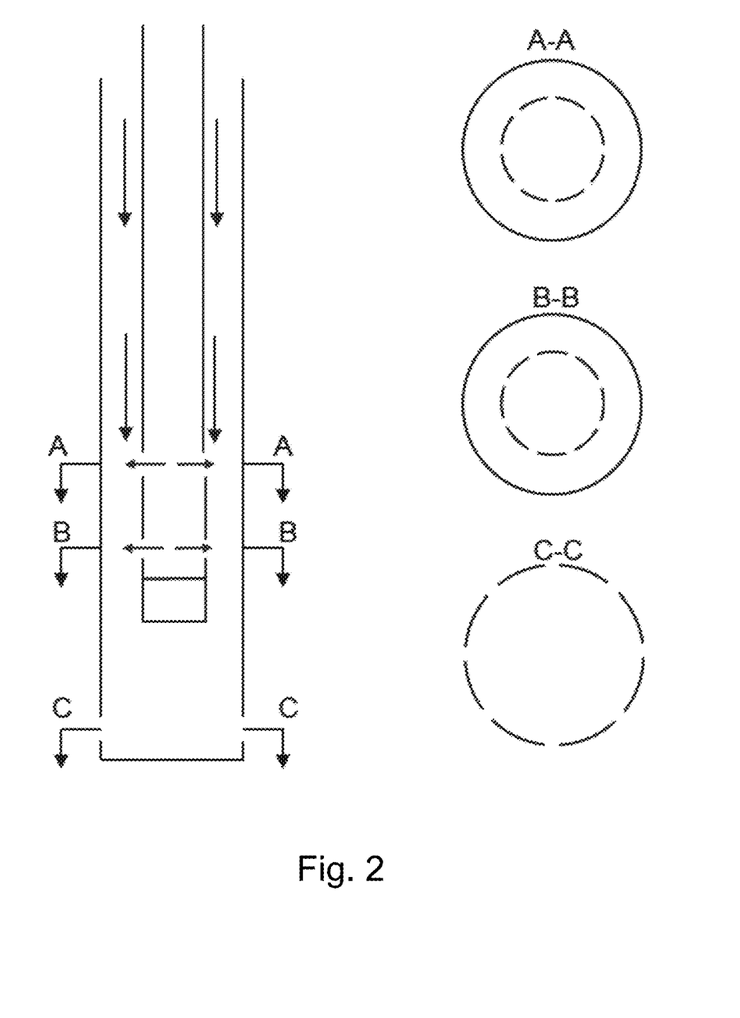
FIG. 2 shows the mixing areas and perforations taken along lines A-A, B-B, and C-C.
Figure 3:
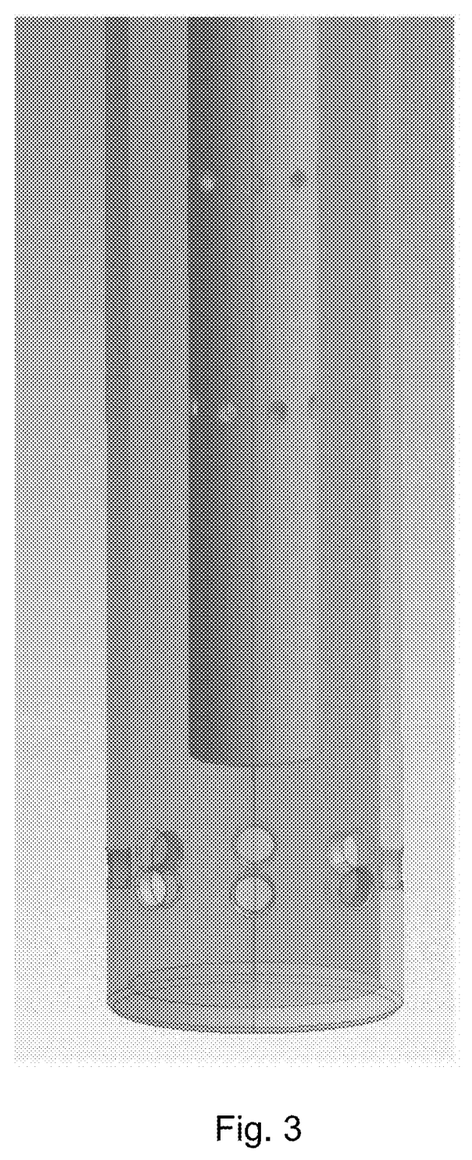
FIG. 3 is a perspective view of the mixing areas and perforations according to certain embodiments.

As can be seen in FIGS. 1 and 2, the downstream end of the inner pipe can be located upstream of the downstream end of the outer pipe, defining an annular mixing zone that is located upstream of the downstream end of the inner pipe, and a cylindrical mixing zone located between the downstream end of the inner pipe and the downstream end of the outer pipe. The plurality of perforations in the outer pipe can be located between the downstream end of the inner pipe and the downstream end of the outer pipe.

The outer diameter of the inner pipe and the outer pipe can vary. According to certain embodiments, the outer diameter of the inner pipe is in a range from about 0.5 inch to about 3 inch. According to certain embodiments, the outer diameter of the outer pipe is in a range from about 0.75 inch to about 5 inch. The thickness of the inner pipe and outer pipe can vary and will typically be chosen to correspond to conventional pipe schedules.

The inner pipe and the outer pipe can be made from a variety of materials. According to certain embodiments, the inner pipe and the outer pipe are made from metals or metal alloys, selected to be compatible with the chemical environment. The inner pipe and outer pipe can also be made from other materials, such as technical ceramics.

The plurality of perforations in the inner pipe allow fluid communication between the inner pipe and the annular mixing zone through which the second gas stream is conveyed. In practice, the first gas stream can be provided into the inner pipe and the second gas stream can be provided into the outer pipe. The first gas stream can exit the inner pipe via the inner pipe perforations, wherein the first gas stream combines with the second gas stream in the annular mixing area to form a combined gas stream. It is to be understood that some of the second gas stream can partially enter the inner pipe via the inner pipe perforations; however, it is preferred that the operating supply pressure of the first and second gas streams are selected such that very little to none of the second gas stream enters the inner pipe, but rather, mixing of the two streams occurs in the annular mixing area.

The mixed gas stream can flow towards the downstream end of the outer pipe. The first gas stream can also mix with the second gas stream or the mixed gas stream can mix with the second gas stream within the cylindrical mixing area. The mixed gas stream can then exit the device via the plurality of perforations in the outer pipe and enter the reactor. As the combined gas stream flows through the annular and cylindrical mixing zones, its components undergo mixing, resulting in a nearly homogenous mixture at the exit of the mixer.

The novel design of the mixer provides rapid mixing of the two gas streams, thus reducing or eliminating the flammability and flashpoint risks. Another advantage of the novel mixer is that the mixer can be operated at a variety of Reynolds numbers. The spacing and pattern of the inner pipe's perforations can also be selected to provide optimal mixing performance. By way of example, more evenly distributed perforations will allow more uniform mixing of the first and second gas streams. By way of another example, the larger the diameter of the perforations, the more distance may be required in order to provide rapid and thorough mixing of the first and second gas streams. The perforations of the inner pipe can be arranged in circular or spiral patterns. Although shown in the drawings with only two rows of circular inner pipe perforations, additional rows of perforations can be added.

The number of perforations of the inner pipe, the diameter of the perforations, and the spacing can all be adjusted to provide rapid and even mixing of the first gas stream with the second gas stream based in part on the diameter of the annular mixing area, the flow rate ratio of the two streams, as well as the flow rate and its corresponding flow regimes. According to certain other embodiments, the perforations of the inner pipe are located a desired distance from the downstream end of the inner pipe. This embodiment can also help reduce or eliminate flammability risks. By way of example, the plurality of perforations in the inner pipe are located upstream of the inner pipe's downstream end by a length of at least 4 to 10 times the hydraulic diameter of the annulus.

The diameter, total number, and spacing of the plurality of perforations in the inner pipe can be selected such that the first gas stream mixes with the second gas stream to form a mixed gas stream with a reduced or eliminated volume of flammable material within the mixer. By way of example, the diameter of the plurality of perforations in the inner pipe can range from about 0.025 inch to about 1 inch. The total number of the plurality of perforations in the inner pipe range can range from about 4 to about 100. The ratio of the spacing between concentric rings or spirals of the plurality of perforations in the inner pipe to the diameter of the inner pipe can range from about 0.1 to about 100.

A system for mixing two gas streams can include the mixer and a reactor. The system can also include a pressure drop device located between the downstream end of the outer pipe and the entrance into the reactor. The pressure drop device can be, for example, a flame arrestor. The reactor can be any reactor that utilizes two gas streams mixed together. According to certain embodiments, the reactor is an OCM reactor and the first gas stream is an oxygen-containing stream and the second gas stream is a hydrocarbon-containing stream.

Figure 6:
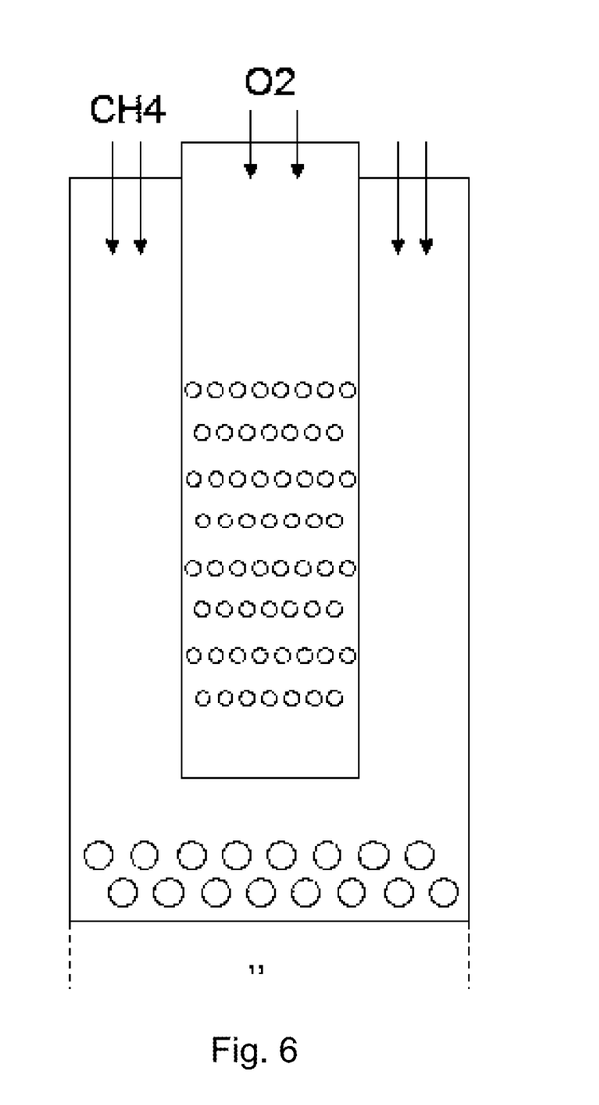
FIG. 6 is a cross-sectional view of a scalable mixer according to certain embodiments.
Figure 7:
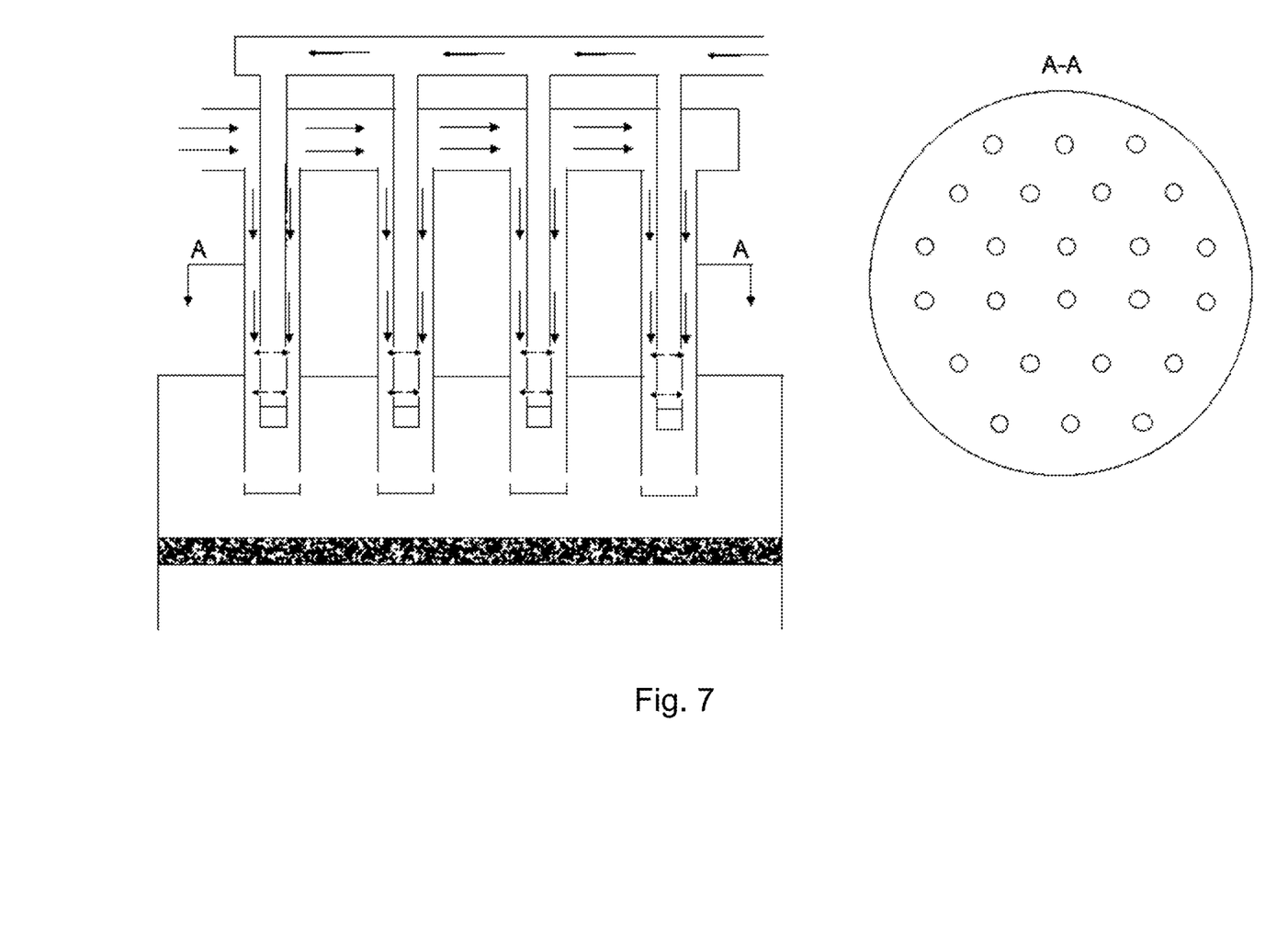
FIG. 7 is a cross-sectional view of an assembly of scalable mixer bundle including multiple mixers that feed into a reactor according to certain other embodiments.

The system can be easily scaled up for larger reactors requiring a larger volume of the mixed gas stream. As can be seen in FIG. 6, the diameter of the inner pipe and the outer pipe can be increased to provide a larger volume of the first gas stream, second gas stream, and mixed gas stream. As can also be seen, the number of perforations of the inner pipe, for example, by increasing the number of rows or spirals, can be increased to provide a greater volume of the first gas stream to enter the annular mixing area. It should be understood that the discussion above regarding the spacing and perforation diameter to reduce or eliminate flammability should be taken into account. As can be seen in FIG. 7, the number of mixers feeding into a single reactor can also be increased in order to provide a larger volume of the mixed gas stream that enters the reactor.

A method for mixing two gas streams comprises: supplying a first gas stream into an inner pipe, wherein: the inner pipe is arranged substantially concentrically within the outer pipe and forms an annulus between an outer diameter of the inner pipe and an inner diameter of the outside pipe; the inner pipe is closed at a downstream end; and the inner pipe comprises a plurality of perforations; supplying a second gas stream into an outer pipe, wherein: a downstream end of the outer pipe extends into a reactor; the outer pipe is closed at the downstream end; and the downstream end of the outer pipe comprises a plurality of perforations; and causing or allowing the first gas stream to mix with the second gas stream to form a mixed gas stream; and allowing the mixed gas stream to enter a reactor.

EXAMPLES

To facilitate a better understanding of the present invention, the following examples of certain aspects of preferred embodiments are given. The following examples are not the only examples that could be given according to the present invention and are not intended to limit the scope of the invention.

A mixer according to the invention was manufactured, verified by Computational Fluid Dynamics (CFD) simulations, and tested. The outer pipe was constructed of schedule 80 pipe. The inner pipe was constructed of schedule 40 pipe. The perforations in the inner pipe were arranged in two circular rows, each containing 8 perforations of 0.12 inch diameter, the rows spaced 1.5 inch apart, and the bottom row located 2.31 inches from the downstream end of the inner pipe. The distance between the downstream end of the inner pipe and the downstream end of the outer pipe was about 1.5 inch. The mixer was tested with a flow of 1 standard cubic feet per minute (scfm) of oxygen flow to the inner pipe, 5 scfm of methane flow to the outer pipe, a back pressure of approximately 18 pounds per square inch absolute (psia), inlet temperatures for the methane stream of 400° C. and the oxygen stream of 25° C.

Figure 4:
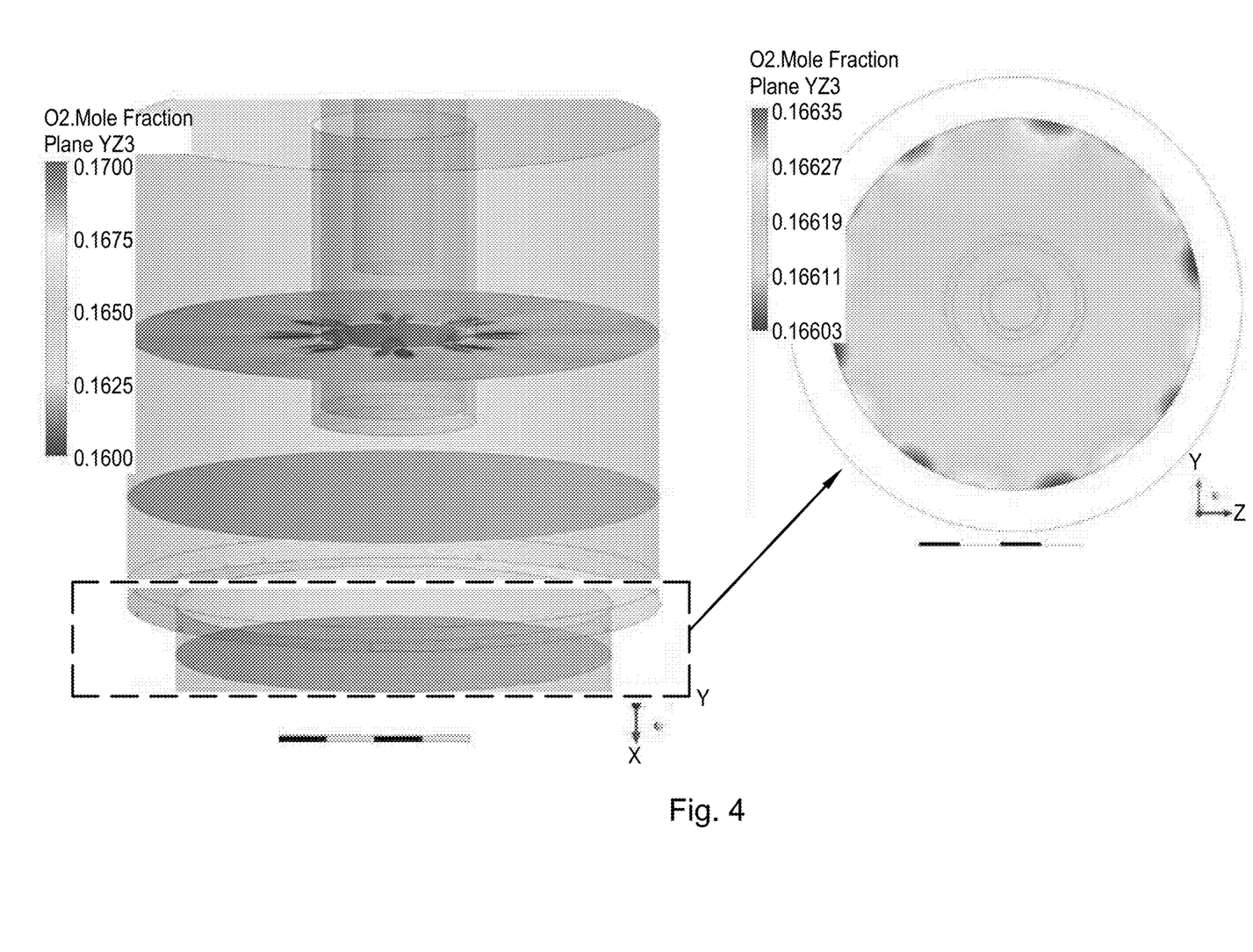
FIG. 4 shows computational fluid dynamics analysis predicting oxygen mole fraction distributions within the mixer and reactor.
Figure 5:
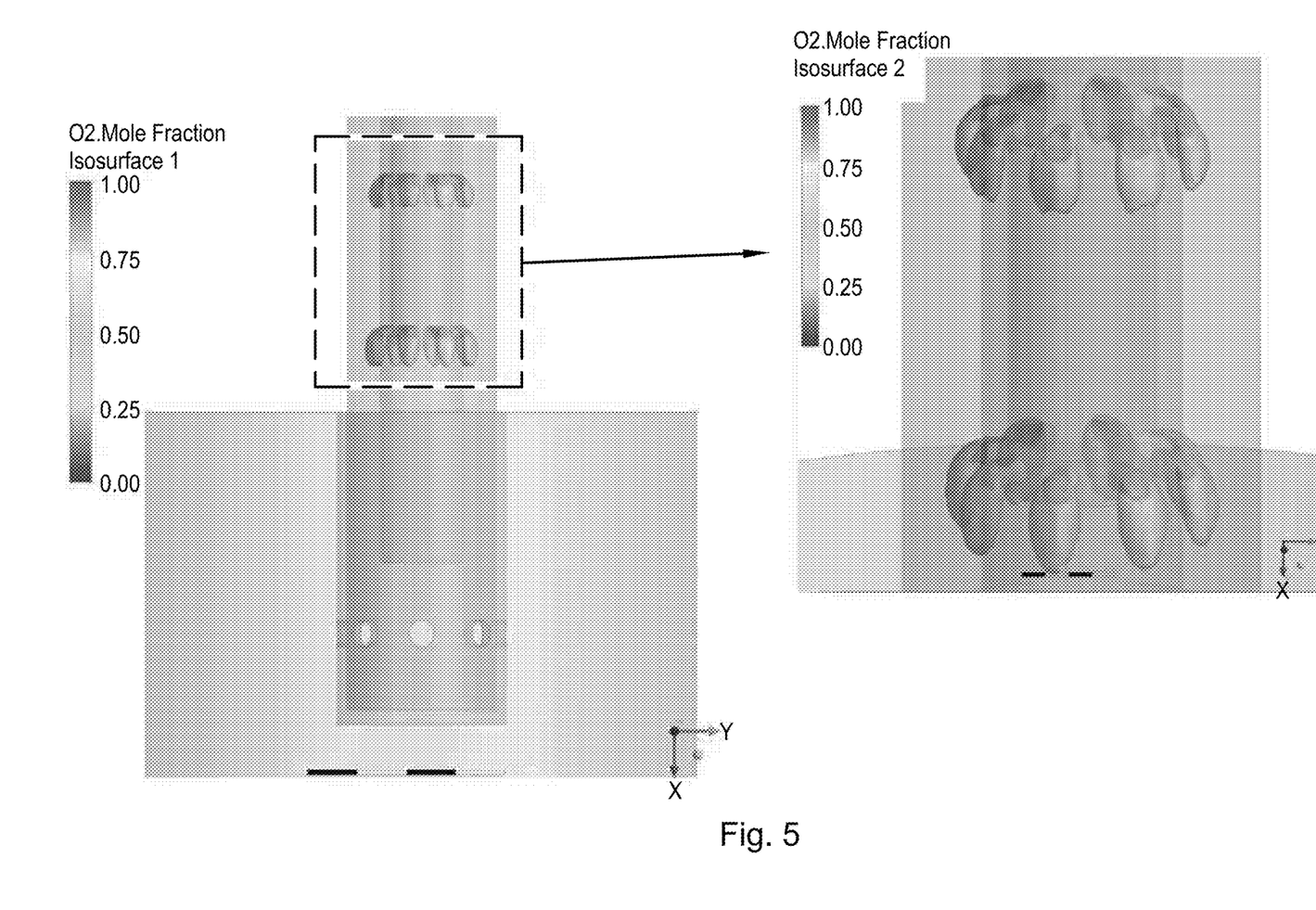
FIG. 5 shows computational fluid dynamics analysis indicating potentially flammable regions within a portion of the mixer.

Computational Fluid Dynamics simulations with Reynolds Averaged Navier-Stokes (RANS) approach was used to verify the design. As can be seen from the simulation results shown in FIG. 4, the novel mixer provides exceptional mixing of the first and second gas streams under the operating conditions described above. The standard deviation of the oxygen mole fraction was below 0.1% at the cross section of the reactor downstream of the flame arrestor. Simulations also proved an even mixing performance under a wide range of Reynolds numbers from near laminar to turbulent flow regimes. As can also be seen in FIG. 5, flammable regions (with oxygen mole fraction between 39%-95% in the gas mixture) at the location of the perforations of the inner pipe were minimized, and impinging velocities at the perforations are low enough to prevent sparks from suspended particles. These figures show that superior mixing is achieved and the risks of flammability and flash point are significantly reduced.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more gas streams, mixers, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A device for mixing two gas streams, the device comprising:
   an inner pipe, wherein:
      the inner pipe is arranged substantially concentrically within an outer pipe and forms an annulus between an outer diameter of the inner pipe and an inner diameter of the outside pipe;
      the inner pipe is closed at a downstream end; and
      the inner pipe comprises a plurality of perforations, wherein the plurality of perforations in the inner pipe are located upstream of the inner pipe's downstream end by a length of at least 4 to 10 times the hydraulic diameter of the annulus; and
   the outer pipe, wherein:
      a downstream end of the outer pipe extends into a reactor;
      the outer pipe is closed at the downstream end; and
      the downstream end of the outer pipe comprises a plurality of perforations.

2. The device according to claim 1, wherein the inner pipe is configured to be supplied with a first gas stream, flowing from an upstream end towards the downstream end of the inner pipe and the outer pipe is configured to be supplied with a second gas stream, flowing from an upstream end towards a downstream end.

3. The device according to claim 2, wherein the first gas stream is an oxygen-containing stream and the second gas stream is a hydrocarbon-containing stream.

4. The device according to claim 3, wherein the oxygen-containing stream is selected from air or oxygen gas.

5. The device according to claim 3, wherein the hydrocarbon-containing stream contains methane.

6. The device according to claim 1, wherein the downstream end of the inner pipe is located upstream of the downstream end of the outer pipe, defining an annular mixing zone that is located upstream of the downstream end of the inner pipe, and a cylindrical mixing zone located between the downstream end of the inner pipe and the downstream end of the outer pipe.

7. The device according to claim 6, wherein the plurality of perforations in the outer pipe are located between the downstream end of the inner pipe and the downstream end of the outer pipe.

8. The device according to claim 7, wherein the plurality of perforations in the inner pipe allow fluid communication between the inner pipe and the annular mixing zone.

9. The device according to claim 7, wherein the first gas stream mixes with the second gas stream in the annular mixing zone to form a mixed gas stream.

10. The device according to claim 9, wherein the mixed gas stream exits the device via the plurality of perforations in the outer pipe and enters the reactor.

11. The device according to claim 1, wherein the inner pipe and the outer pipe are made from metals or metal alloys.

12. The device according to claim 2, wherein the first gas stream mixes with the second gas stream to form a mixed gas stream with a reduced volume of flammable material within mixer.

13. The device according to claim 12, wherein the diameter, total number, and spacing of the plurality of perforations in the inner pipe are selected such that the first gas stream mixes with the second gas stream to form a mixed gas stream with a reduced volume of flammable material within mixer.

14. The device according to claim 1, wherein the plurality of perforations in the inner pipe are arranged circumferentially around the inner pipe in concentric rings or a spiral pattern.

15. A system for mixing two gas streams comprising:
a mixer comprising:
an inner pipe, wherein:
the inner pipe is arranged substantially concentrically within an outer pipe and forms an annulus between an outer diameter of the inner pipe and an inner diameter of the outside pipe;
the inner pipe is closed at a downstream end; and
the inner pipe comprises a plurality of perforations, wherein the plurality of perforations in the inner pipe are located upstream of the inner pipe's downstream end by a length of at least 4 to 10 times the hydraulic diameter of the annulus; and
the outer pipe, wherein:
a downstream end of the outer pipe extends into a reactor;
the outer pipe is closed at the downstream end; and
the downstream end of the outer pipe comprises a plurality of perforations; and
the reactor.

16. The system according to claim 15, wherein the inner pipe is configured to be supplied with a first gas stream, flowing from an upstream end towards the downstream end of the inner pipe and the outer pipe is configured to be supplied with a second gas stream, flowing from an upstream end towards a downstream end, and wherein the first gas stream is an oxygen-containing stream and the second gas stream is a hydrocarbon-containing stream.

17. The system according to claim 15, wherein the reactor is an oxidative coupling of methane reactor.

18. A method for mixing two gas streams comprising:
supplying a first gas stream into an inner pipe, wherein:
the inner pipe is arranged substantially concentrically within the outer pipe and forms an annulus between an outer diameter of the inner pipe and an inner diameter of the outside pipe;
the inner pipe is closed at a downstream end; and
the inner pipe comprises a plurality of perforations, wherein the plurality of perforations in the inner pipe are located upstream of the inner pipe's downstream end by a length of at least 4 to 10 times the hydraulic diameter of the annulus;
supplying a second gas stream into an outer pipe, wherein:
a downstream end of the outer pipe extends into a reactor;
the outer pipe is closed at the downstream end; and
the downstream end of the outer pipe comprises a plurality of perforations; and
causing or allowing the first gas stream to mix with the second gas stream to form a mixed gas stream; and
allowing the mixed gas stream to enter a reactor.

19. The method according to claim 18, wherein the first gas stream is a hydrocarbon-containing stream and the second gas stream is an oxygen-containing stream.

20. The method according to claim 18, wherein the reactor is an oxidative coupling of methane reactor.

\* \* \* \* \*